(12) United States Patent
McColloch et al.

(10) Patent No.: US 8,358,504 B2
(45) Date of Patent: Jan. 22, 2013

(54) DIRECT COOLING SYSTEM AND METHOD FOR TRANSCEIVERS

(75) Inventors: Laurence Ray McColloch, Santa Clara, CA (US); Paul Yu, Mountain View, CA (US)

(73) Assignee: Avago Technologies Enterprise IP (Singapore) Pte. Ltd., Singapore (SG)

( * ) Notice: Subject to any disclaimer, the term of this patent is extended or adjusted under 35 U.S.C. 154(b) by 213 days.

(21) Appl. No.: 13/008,461

(22) Filed: Jan. 18, 2011

(65) Prior Publication Data

US 2012/0182688 A1 Jul. 19, 2012

(51) Int. Cl.
*H05K 7/20* (2006.01)
*G06B 6/36* (2006.01)

(52) U.S. Cl. ............... 361/692; 361/679.46; 361/690; 361/715; 361/716; 398/135; 398/139; 385/14; 385/92; 385/88; 439/607.21; 439/607.1; 439/607.2

(58) Field of Classification Search .. 361/679.46–679.5, 361/690–697, 704–712, 714–727; 165/80.3, 165/104.33, 121–126, 185; 257/713–719; 174/50, 50.51, 16.3, 252; 385/14, 88, 89, 385/92, 135; 398/135, 139, 152, 164
See application file for complete search history.

(56) References Cited

U.S. PATENT DOCUMENTS

| | | | | |
|---|---|---|---|---|
| 5,047,835 A * | 9/1991 | Chang | | 257/433 |
| 5,767,999 A * | 6/1998 | Kayner | | 398/164 |
| 6,431,765 B1 * | 8/2002 | Chen et al. | | 385/92 |
| 6,508,595 B1 * | 1/2003 | Chan et al. | | 385/92 |
| 6,583,902 B1 * | 6/2003 | Yuen | | 398/135 |
| 6,729,905 B1 * | 5/2004 | Hwang | | 439/607.21 |
| 6,731,519 B1 * | 5/2004 | Hwang | | 361/818 |
| 6,746,158 B2 | 6/2004 | Merrick | | |
| 6,762,940 B2 | 7/2004 | Zaremba | | |
| 6,788,540 B2 * | 9/2004 | Kruger et al. | | 361/719 |
| 6,816,376 B2 * | 11/2004 | Bright et al. | | 361/704 |
| 6,866,544 B1 * | 3/2005 | Casey et al. | | 439/607.2 |
| 6,916,122 B2 | 7/2005 | Branch et al. | | |
| 6,940,723 B2 * | 9/2005 | Ice et al. | | 361/709 |
| 6,948,864 B2 * | 9/2005 | Reilly et al. | | 385/92 |
| 6,980,437 B2 | 12/2005 | Bright | | |
| 6,992,895 B2 * | 1/2006 | Lindberg | | 361/719 |
| 7,048,452 B2 * | 5/2006 | Malagrino, Jr. | | 385/92 |
| 7,059,887 B1 | 6/2006 | Liu | | |
| 7,073,960 B2 * | 7/2006 | Anderl et al. | | 385/92 |
| 7,111,994 B2 * | 9/2006 | Schwiebert et al. | | 385/92 |
| 7,178,996 B2 | 2/2007 | Malagrino, Jr. et al. | | |
| 7,255,490 B2 | 8/2007 | Zhang et al. | | |
| 7,281,864 B2 * | 10/2007 | Mizue et al. | | 385/92 |

(Continued)

*Primary Examiner* — Michail V Datskovskiy

(57) ABSTRACT

Systems and methods for direct cooling of transceivers, including transceivers used in electrical and optical communications systems. An electrical system includes a transceiver module with a housing that contains a plurality of apertures to allow air flow into and out of the transceiver module. The transceiver includes an internal heat sink located within the housing of the transceiver module, where the internal heat sink is thermally coupled to at least one internal component of the transceiver module. The electrical system also includes a cage for receiving and electrically connecting to the transceiver module. The cage contains a second set of apertures such that when the transceiver module is inserted into the cage, air may flow into the cage through the second set of apertures, then flow into the transceiver module through one of the plurality of apertures in the transceiver module housing such that the air dissipates heat from the at least one internal component thermally coupled to the internal heat sink. The air may then flow out of the transceiver module through another of the plurality of apertures in the housing.

20 Claims, 8 Drawing Sheets

U.S. PATENT DOCUMENTS

| | | | |
|---|---|---|---|
| 7,314,318 B2 * | 1/2008 | Anderl et al. | 385/92 |
| 7,317,617 B2 * | 1/2008 | Meadowcroft et al. | 361/715 |
| 7,371,965 B2 | 5/2008 | Ice | |
| 7,410,307 B2 | 8/2008 | Sasser et al. | |
| 7,452,216 B2 * | 11/2008 | Murr et al. | 439/74 |
| 7,529,094 B2 * | 5/2009 | Miller | 361/715 |
| 7,621,773 B2 | 11/2009 | Bright et al. | |
| 7,637,672 B1 * | 12/2009 | Li et al. | 385/92 |
| 7,668,215 B2 * | 2/2010 | Scofet et al. | 372/36 |
| 7,764,504 B2 * | 7/2010 | Phillips et al. | 361/715 |
| 7,898,808 B2 * | 3/2011 | Joiner et al. | 361/707 |
| 7,974,098 B2 * | 7/2011 | Oki et al. | 361/715 |
| 8,035,973 B2 * | 10/2011 | McColloch | 361/709 |
| 8,068,338 B1 * | 11/2011 | Tamarkin | 361/692 |
| 8,081,470 B2 * | 12/2011 | Oki et al. | 361/715 |
| 8,279,601 B2 * | 10/2012 | Lima et al. | 361/694 |
| 2003/0118293 A1 * | 6/2003 | Canace et al. | 385/92 |
| 2004/0207988 A1 * | 10/2004 | Branch et al. | 361/728 |
| 2006/0126306 A1 | 6/2006 | Blair et al. | |
| 2007/0009213 A1 | 1/2007 | Meadowcroft et al. | |
| 2008/0019100 A1 * | 1/2008 | Yang | 361/716 |
| 2009/0202207 A1 | 8/2009 | Grzegorzewska et al. | |
| 2011/0164382 A1 * | 7/2011 | Pirillis | 361/690 |

* cited by examiner

DIRECT COOLING SYSTEM AND METHOD FOR TRANSCEIVERS

TECHNICAL FIELD OF THE INVENTION

This invention relates generally to the field of transceivers. Exemplary embodiments relate to systems and methods for direct cooling of transceivers, including transceivers used in electrical and optical communications systems.

BACKGROUND OF THE INVENTION

Fiber optics are widely used as a medium for transmitting voice and data signals. As a transmission medium, light provides advantages over traditional electrical communication techniques. For example, light signals allow for relatively high transmission rates as well as for transmission over great distances without signal loss, and light signals are resistant to electromagnetic interferences that can interfere with electrical signals.

Optical communications systems present a number of implementation challenges. For example, the data carried by light signal must be converted from an electrical signal to light at the sending device, and then converted from light back to an electrical signal at the receiving device. Thus, in an optical communication system, it is typically necessary to couple an optical fiber to an opto-electronic transmitter, receiver or transceiver device and to, in turn, couple the device to an electronic system such as a switching system or processing system.

These connections can be facilitated by modularizing the transceiver device used at both the sending and receiving device. Various transceiver module configurations are known for interfacing with a host device, such as a host computer, switching hub, network router, switch box, computer I/O and the like. For example, the optical transceiver module 10 illustrated in partially disassembled form in FIG. 1 has a standard configuration or form commonly referred to as a Small Form-Factor (SFF) or SFF-Pluggable (SFP) format. Transceiver module 10 includes a metallic module housing shown in FIG. 1 as upper housing portion 12a and lower housing portion 12b in which are housed opto-electronic elements, optical elements 14, and electronic elements 16, such as one or more light sources (e.g., lasers), light sensors, lenses and other optics, digital signal driver and receiver circuits, etc.

The front end of transceiver module 10 further includes a transmitter receptacle 18 and a receiver receptacle 20 into which optical fiber cables (not shown) are pluggable. The optical cable plug or connector body (not shown) can be any of the standard type known in the field. The rear end of the transceiver module 10 typically has a plug portion 22 with electrical contacts 24 located thereon. As shown in FIG. 2, a transceiver module 10 can be plugged into a bay 32 in the chassis or cage 34 of an electronic system 30 by inserting the plug end 22 of transceiver module 10 into a bay 32 opening in the cage 34 and latching transceiver module 10 in place by any of a variety of know methods. The cage 34 is typically attached to a PCB 36, which is also part of the electronic system 30. The PCB 36 typically contains electrical interconnections (not shown) that come into contact with the electrical contacts 24 located on the plug end 22 of the electrical assembly 16 when the transceiver module 10 is inserted into the bay 32 of the cage 34.

Transceiver module size is of concern in the art. The width of housing 12a and 12b is substantially dictated by the two side-by-side receptacles 18 and 20. That is, housing 12a and 12b is at least as wide as the two connectors. Multiple transceiver modules of this type can thus be plugged into a cage panel at a pitch on the order of about every one-half inch. International and industry standards have been adopted that define the physical size and shape of optical transceiver modules to insure compatibility between different manufacturers, including the standards set forth in the Small Form-Factor Pluggable Transceiver Multisource Agreement. This standard defines not only the details of the electrical interface with compliant transceiver modules, but also the physical size and shape for compliant transceiver modules, and the corresponding module cage mounted on a printed circuit board for receiving the transceiver modules.

As the protocols used in optical networks increase in transmission speed, the heat generated by the transceivers typically increases, especially for smaller transceiver modules. For instance, 10-Gigabit transceivers generally require heat dissipation mechanisms. Thus, transceiver module cooling is a concern in the art. The heat emitted by the electronics and opto-electronics in a transceiver module 10 such as that shown in FIG. 1 and FIG. 2 is commonly conducted away from transceiver module 10 by metallic portions of the cage 34 in which transceiver module 10 is plugged.

Heat sinks can be included on the outside of the transceiver module 10 housing 12a and 12b and/or attached to the top surface of the cage 34 to dissipate this heat. However, such external heat sinks are inefficient as they cool all internal components of the transceiver module 10 to roughly the same temperature. Such external heat sinks do not allow for focused cooling of the internal components of the transceiver module 10 with lower operating temperatures, while not cooling internal components having maximum allowed operating temperatures.

Additionally, conventional external heat sinks provide design challenges in instances in which many transceiver modules are arranged closely together in connected cages. One such design challenge is that a conventional heat sink mounted to the top surface of the cage 34 prevents stacking transceiver modules on top of each other because only the uppermost transceiver module 10 is in contact with cage 34 and thus only the uppermost transceiver module 10 receives adequate heat dissipation. Thus, typical cages 34 allow for several transceiver modules 10 to be located side-by-side in the horizontal direction, but only allow for one transceiver module 10, or at most, two transceiver modules 10 to be stacked in the vertical direction.

SUMMARY OF THE INVENTION

Embodiments of the present invention relate to systems for direct cooling of transceivers, including transceivers used in electrical and optical communications systems. Methods of cooling are also provided. In an exemplary embodiment, an electrical system includes a transceiver module with a housing that contains a plurality of apertures to allow air flow into and out of the transceiver module. The transceiver also includes an internal heat sink located within the housing of the transceiver module, where the internal heat sink is thermally coupled to at least one internal component of the transceiver module. The electrical system also includes a cage for receiving and electrically connecting to the transceiver module. The cage contains a second set of apertures such that when the transceiver module is inserted into the cage, air can flow into the cage through the second set of apertures, then flow into the transceiver module through one of the plurality of apertures in the transceiver module housing such that the air dissipates heat from the at least one internal component thermally coupled to the internal heat sink. The air can then flow out of the transceiver module through another of the plurality of apertures in the housing.

In an additional, exemplary embodiment, an optical transceiver for use in an electrical system with a housing assembly containing a plurality of apertures located in at least one surface of the housing. The optical transceiver includes an electronics subassembly (ESA), light source, and light receiver located in the housing assembly. The optical transceiver also includes an internal heat sink located in the housing assembly where the internal heat sink is thermally coupled to at least one of the ESA, light source, and light receiver. The internal heat sink is configured to dissipate heat when air flows into the housing assembly through one of the plurality of apertures, by the internal heat sink, and then out of the housing assembly through another of the plurality of apertures. Methods of cooling are also provided.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
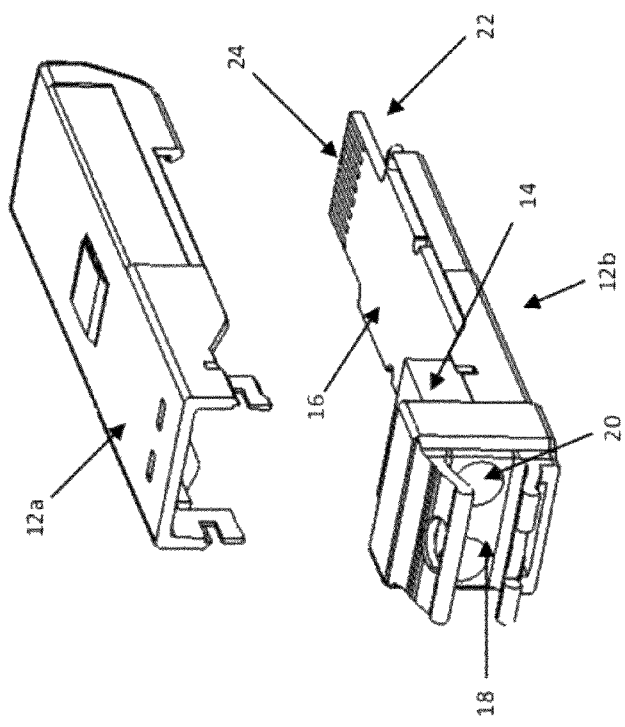
FIG. 1 is a perspective exploded view of an optical transceiver module of a type known in the art.
Figure 2:
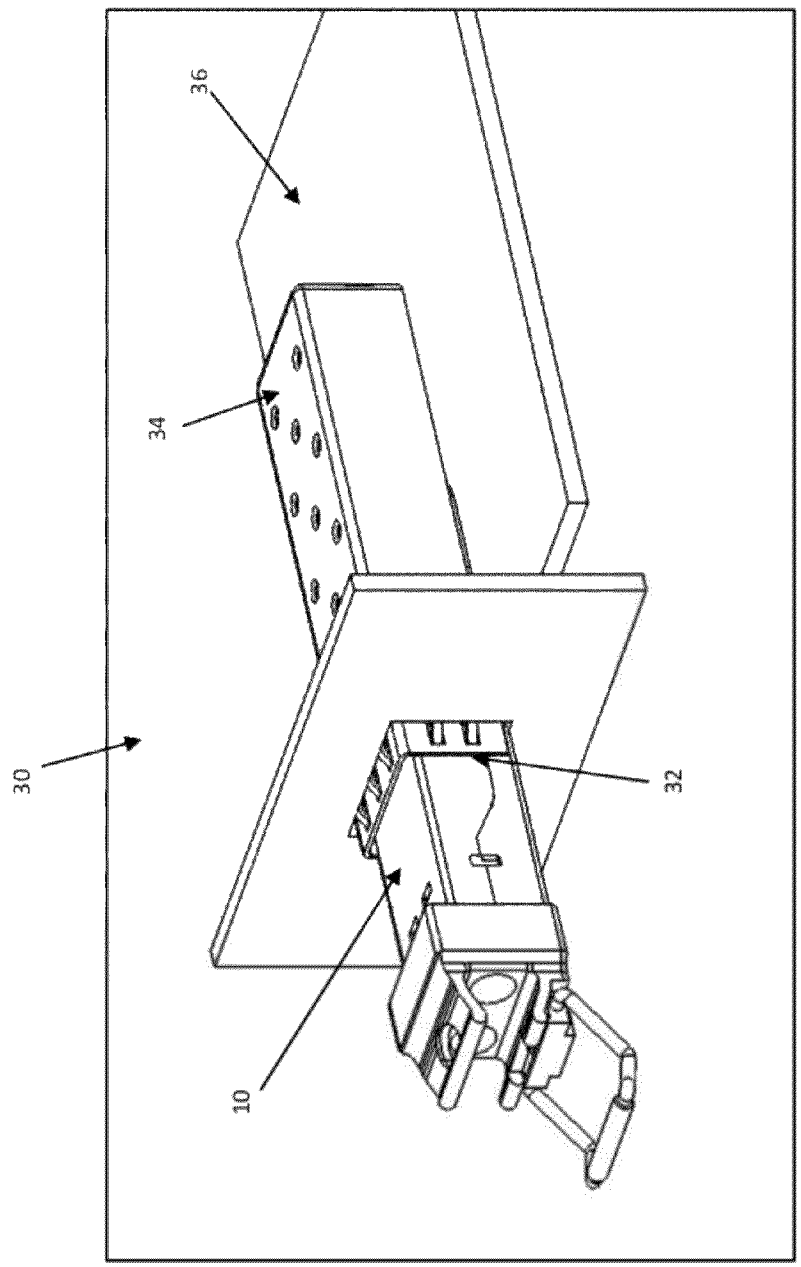
FIG. 2 is a perspective view of the optical transceiver module of FIG. 1 inserted into a cage of a type known in the art.
Figure 3:
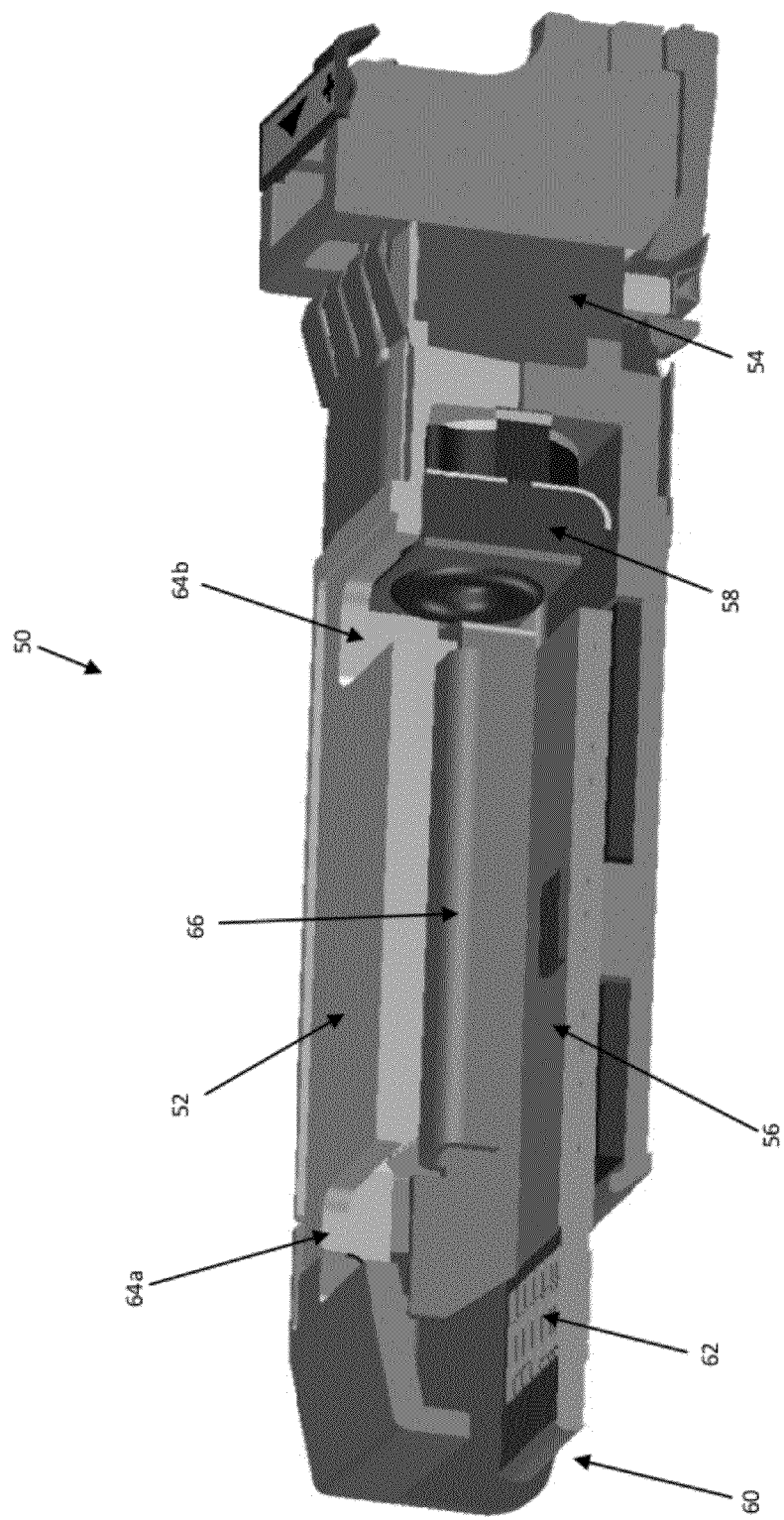
FIG. 3 is a side cut-away view of an optical transceiver module of one embodiment of the present invention.

Referring initially to FIG. 3, an illustrative or exemplary embodiment of the invention which includes optical transceiver module 50 is shown with an elongated, generally rectangular shape defined by an elongated housing assembly 52 with a receptacle 54 disposed at a front end of housing assembly 52. Depending on the type of receptacle 54 used, the receptacle 54 can accept a single-fiber (or "simplex") optical cable plug connector or dual-fiber (or "duplex") optical cable plug of the various types known for use with electrical or optical systems.

Figure 4:
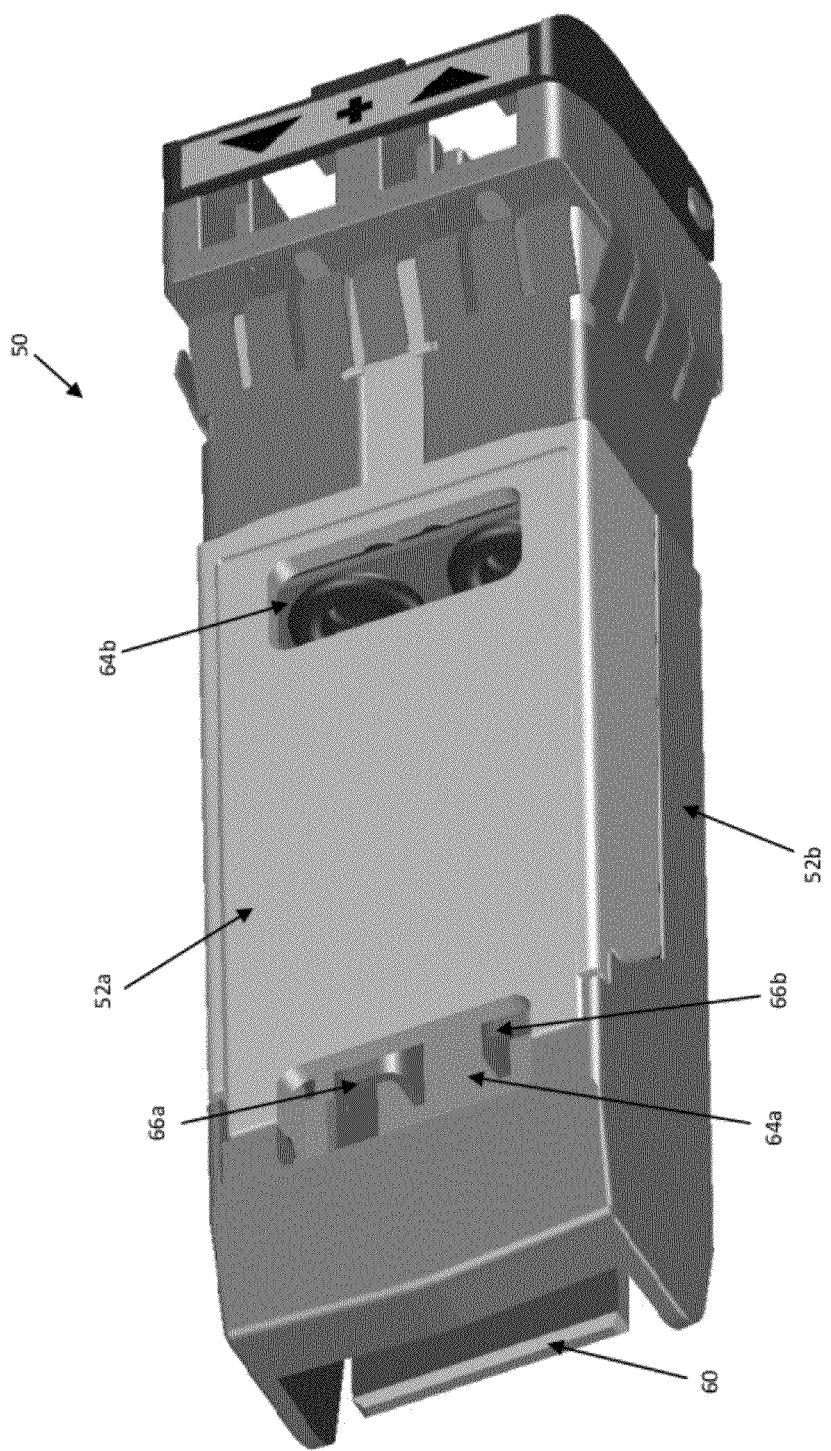
FIG. 4 is a perspective view of the embodiment of the optical transceiver module shown in FIG. 3.

Although in the exemplary embodiment the housing assembly 52 is shown as one unit (with part of the housing assembly 52 cut away in FIG. 3 for ease of understanding the optical transceiver module 50), the housing assembly 52 may be comprised of separate pieces that are connected together to form the housing for the optical transceiver module 50 (see FIG. 4). Unless specifically stated otherwise, any element described herein or a similar element can be unitarily formed with another element in some embodiments or a separate element (i.e., a part of a multi-part assembly element) in other embodiments. Furthermore, a reference to an element as an "assembly" or "subassembly" herein is not intended to restrict the meaning to a structure having multiple parts or portions, and in other embodiments such an element or a similar element can be unitarily formed or, alternatively, can comprise any other suitable number of parts or portions.

As illustrated in FIG. 3, optical transceiver module 50 further includes an electronics subassembly (ESA) 56. The exemplary embodiment of the ESA 56 shown has a generally planar substrate on which electronic and electro-optical elements, such as a light source 58, a light receiver (not shown), a feedback receiver (not shown), and various driver and receiver circuit devices and other such circuit devices may be mounted. Light source 58 can be a light-emitting diode or laser, such as a vertical-cavity surface-emitting laser (VCSEL). Light receiver and feedback receiver can be photo-diodes, such as a positive-intrinsic-negative (PIN) diode.

In the exemplary embodiment, the substrate of the ESA 56 is attached to the bottom of the transceiver housing assembly 52. That is, in the exemplary embodiment, the bottom surface of the ESA 56 substrate, on which a variety of circuit devices may be mounted, is adhered to or otherwise disposed on the topside of the bottom surface of transceiver housing assembly 52, while light source 58 and other components such as a light receiver and feedback receiver may be mounted directly on the surface of transceiver housing assembly 52.

The embodiment shown in FIG. 3 is exemplary, and other configurations of the components discussed above, as well as the addition or subtraction of various components, are possible and would be within the scope of the present invention. Although not shown for purposes of clarity, the various electronic and electro-optical elements are electrically connected to one another by wirebonds and the circuit traces on ESA 56 substrate. As shown in FIG. 3, the exemplary ESA 56 is generally contained within the housing assembly 52; however, as known for such transceivers, the ESA 56 may include a plug portion 60 at the rear end of the optical transceiver module 50 that extends from and/or is uncovered by the housing assembly 52. Further, the plug portion 60 of the ESA 56 may also include an array of electrical contacts 62, which can be metallic pads on a flex circuit of the ESA 56. The array of electrical contacts 62 mates with mating contacts (not shown) in a transceiver bay 110, 112 of cage 100 (FIG. 5) when transceiver module 50 is plugged into one of transceiver bays 110, 112 as discussed below.

In the exemplary embodiment, transceiver housing assembly 52 is made of a suitable metal such as nickel-plated copper, which as with conventional optical transceivers, can serve as a heat sink for light source 58 and other components mounted or disposed on the transceiver housing assembly 52 including the ESA 56. The exemplary embodiment of the transceiver housing assembly 52 includes air flow ports 64a and 64b to allow for direct cooling the internal components of the optical transceiver module 10. The air flow ports 64a and 64b are configured to allow air to be blown into one of the air flow ports 64a, over the internal components of the optical transceiver module 10, and out the second air flow port 64b while the optical transceiver module is engaged in a bay 110 of the cage 100 (see FIG. 8). As shown in FIG. 3 (and in FIG.

4 below), in the exemplary embodiment, the air flow ports 64a and 64b are both apertures in the top surface of the housing assembly 52. In other embodiments, the air flow ports 64a and 64b may be apertures in a different surface of the housing assembly 52, or one air flow port 64a may be an aperture in a first surface of the housing assembly while a second air flow port 64b may be an aperture in a second surface of the housing assembly. Similarly, in various embodiments, more than two air flow ports 64a and 64b may be used.

The exemplary embodiment of the optical transceiver module 10 also includes an internal heat sink 66 to further allow for direct cooling of the internal components of the optical transceiver module 10. The internal heat sink 66 is made of any suitable metal for heat sinks, such as copper. In the exemplary embodiment shown in FIG. 3, the internal heat sink 66 is connected to the light source 58 such that heat generated by the operation of the light source 58 is dissipated by the internal heat sink 66. Thus, as described more fully below, during operation of the optical transceiver module 10, the heat generated by light source 58 can be drawn away from the light source 58 by the internal heat sink 66, and then dissipated by the flow of air through the first air flow ports 64a, over the internal heat sink 66, and out the second air flow port 64b, greatly increasing the heat dissipation of each optical transceiver module 10.

In the embodiment shown in FIG. 3, a single internal heat sink 66 is connected to the light source 58 to provide direct cooling of the light source 58, while the other internal components are cooled in the conventional manner, using the transceiver housing assembly 52 as the heat sink to dissipate heat generated by the other components during operation. In other embodiments, the internal heat sink 66 could be connected to, and dissipate heat from, a different component of the optical transceiver module 10, such as the ESA 56, while the light source 58 could be cooled in the traditional manner using the transceiver housing assembly 52 as a heat sink.

In additional embodiments, multiple components of the optical transceiver module may be connected to the internal heat sink 66, such that the internal heat sink 66 may provide direct cooling to more than one internal component. In still other embodiments, multiple internal heat sinks 66 may be used in a single optical transceiver module 10, such that different internal components or different groups of internal components, of the optical transceiver module 10 may have their own dedicated internal heat sink 66. In such embodiments, different internal components may have internal heat sinks 66 made of differing materials, which, for example, may provide differing levels of heat dissipation to different internal components.

FIG. 4 is a perspective view of an exemplary embodiment of the optical transceiver module 50. In the embodiment shown in FIG. 4, the transceiver housing assembly 52 includes a top portion 52a and frame portion 52b such that top portion 52a engages with the frame portion 52b to form the transceiver housing assembly 52. FIG. 4 also shows the air flow ports 64a and 64b, which in this embodiment are substantially rectangular openings into the top surface of the transceiver housing assembly 52. FIG. 4 also partially shows an embodiment of the optical transceiver module 50 with two internal heat sinks 66a and 66b which are partially visible through air flow port 64a. Although the exemplary transceiver module is shown in FIG. 3 and FIG. 4 as an optical transceiver module 50, the principles of the present inventions are equally applicable to other embodiments in which the transceiver module is not an optical transceiver, but is some other type of transceiver intended for use in an electrical system. Similarly, although the exemplary optical transceiver module 50 illustrated in FIG. 3 and FIG. 4 is an SFP transceiver, the present invention is not limited optical transceivers with the SFP form factor, and the principles of the present invention are equally applicable to other optical transceivers such as SFF, SFP+, QSFP, XFP, etc.

Figure 5:
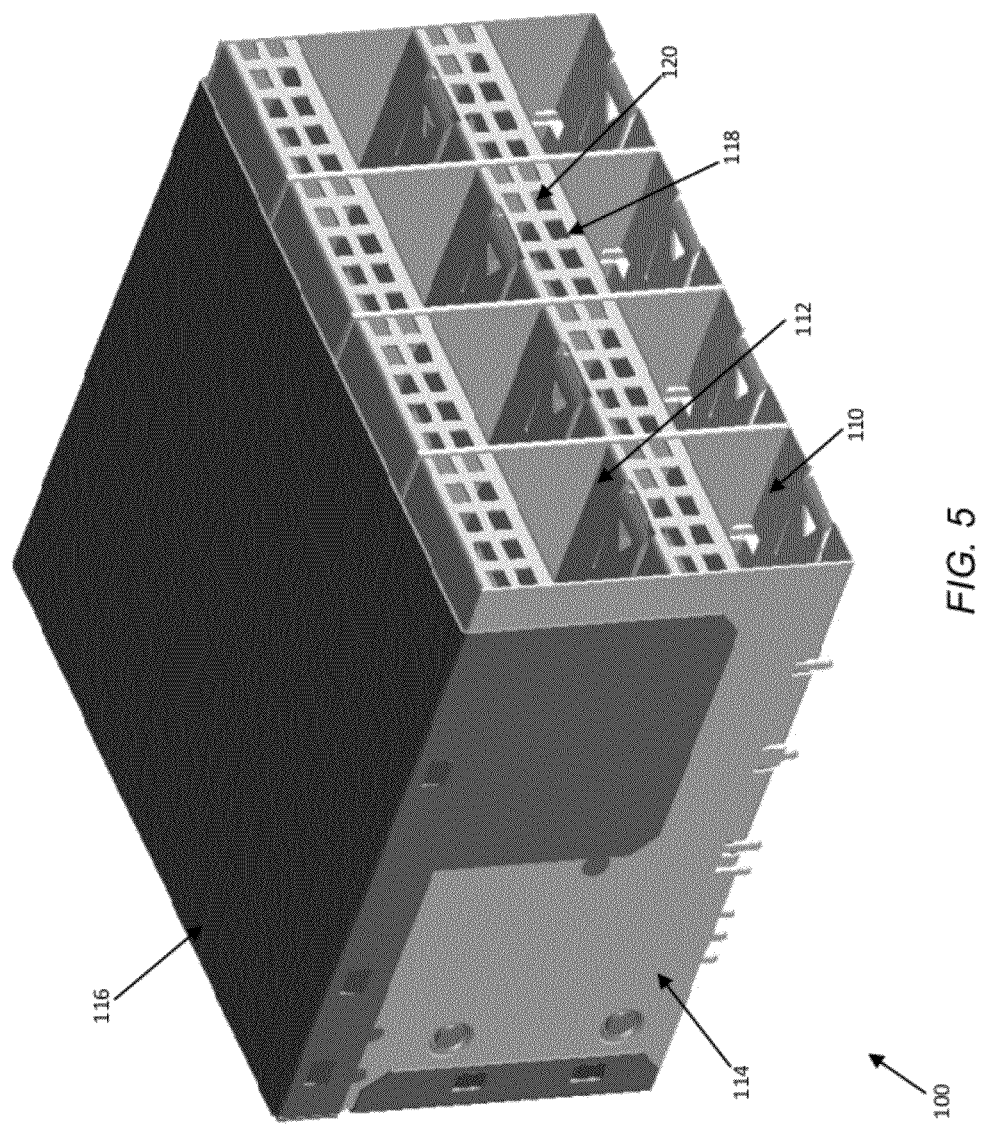
FIG. 5 is a perspective view of an embodiment of the cage for use with optical transceiver modules such as that shown in FIG. 3.

Turning now to FIG. 5, the optical transceiver module 50 can be inserted, or plugged into any one of a number of transceiver bays 110, 112 in a cage 100. Such cages 100 may be used as part of an electronic system. Exemplary electronic systems can be, for example, a switching system, a processing system, or any other suitable type of system that can be interfaced with an optical transceiver, or for which a transceiver may be used.

The cage 100 may use any number of transceiver bays 110, 112, arranged in a variety of configurations. In the embodiment illustrated in FIG. 5, transceiver bay 112 is shown stacked vertically on top of transceiver bay 110. Transceiver bay 112 will also be referred to as upper transceiver bay 112 herein, and the bottom of the two transceiver bays 110 will be referred to as lower transceiver bay 110 for clarity sake when discussing various embodiments. It should be understood that the terms "upper" and "lower" as used herein are intended only for convenience of reference with regard to the illustrated embodiment and are not intended to imply any limitation to the manner in which elements can be oriented.

The exemplary cage 100 is made of any appropriate material such as sheet metal, but may be any other useful material, including a material useful for thermally conducting heat away from the optical transceiver modules 50 inserted in the transceiver bays 110, 112 of the cage 100. Additionally, the cage 100 of FIG. 5 includes a side surface 114 and a top surface 116. Either of the side surface or top surface, or both, may also be configured with external heat sinks (not shown) of the type conventionally used to provide heat dissipation for such systems.

As shown in FIG. 5, each transceiver bay 110 and 112 has a generally rectangular opening corresponding to the profile of the optical transceiver module 50. The exemplary cage 100 also has a front panel 118 for each transceiver bay 110, 112, where the front panel 118 includes apertures 120. These apertures 120 in the front panels 118 allow air that has entered the back of the cage 100 (see FIG. 6 and FIG. 8) and flowed through the optical transceiver module 50 (see FIG. 4 and FIG. 8) to exit the cage 100, as will be discussed below. As would be understood by one of skill in the art, the exemplary transceiver bays 110 and 112 shown in FIG. 5 are generally rectangular to correspond to the exemplary SFP optical transceiver module 50 shown in FIG. 3 and FIG. 4. If a different type of transceiver was used other than an optical transceiver, or if a different form factor of optical transceiver module 50 was used (such as SFF, SFP+, QSFP, XFP, etc.), the shape and configuration of the transceiver bays 110 and 112 (and cage 100) may correspondingly change and would still fall within the scope of the present invention.

Multiple transceiver bays 110 and 112 of cage 100 may be stacked vertically and/or horizontally as shown in FIG. 5. Although only two transceiver bays 110, 112 are shown stacked in the exemplary embodiment of FIG. 5, the present invention contemplates embodiments with more than two transceiver bays 110, 112 stacked in the vertical direction. In this way, multiple optical transceiver modules 50 may be relatively densely arranged in the cage 100 arranged both horizontally and vertically by inserting an optical transceiver module 50 into each transceiver bay 110, 112. To accommodate an optical transceiver module 50, each transceiver bay 110, 112 in the cage has a connector portion 124a, 124b (see FIGS. 6 and 8) configured to receive the plug end 60 of the optical transceiver module 50. As will be described more fully below, when an optical transceiver module 50 is plugged into a transceiver bay 110, 112 the electrical contacts 62 of the plug end 60 of the optical transceiver module 50 engages and electrically connects with the connector portion 124a, 124b of the transceiver bays 110, 112.

Figure 6:
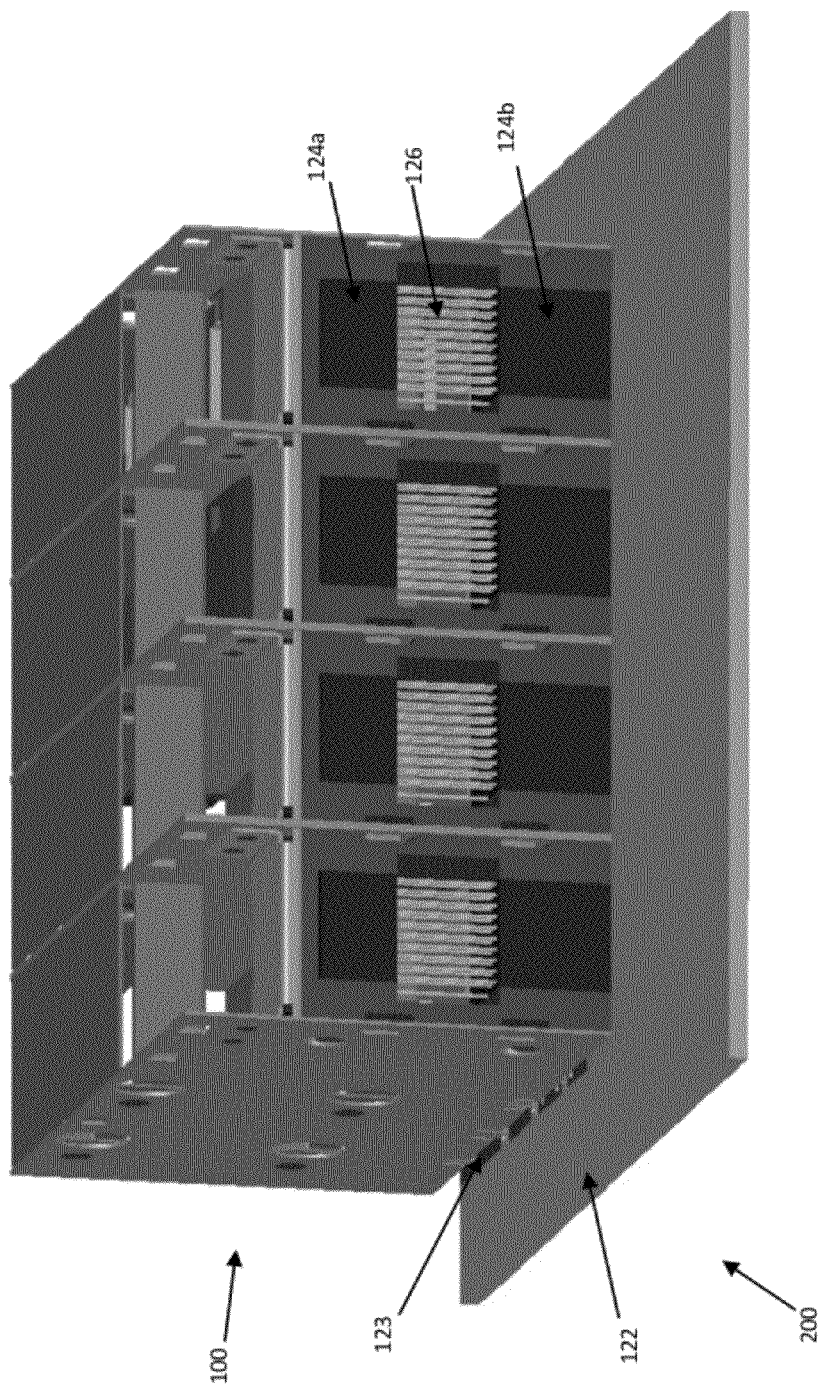
FIG. 6 is a back view of the embodiment of the cage shown in FIG. 5 with the cover removed.

FIG. 6 shows a back view of the exemplary cage 100 with the top surface 116 removed, as well as the back removed for clarity. The cage 100 of FIG. 6 is shown connected to PCB 122 which together with the cage 100 comprises part of an electronic system 200. The electronic system 200 may be part of a device, such as a host computer, switching hub, network router, switch box, computer I/O, or the like which typically receive or send optical signals. PCB 122 contains electrical interconnections 123 that are electrically connected to the connector portions 124a, 124b of the transceiver bays 110, 112 when the cage 100 is attached to the PCB 122. As shown in FIG. 6, at the rear of the upper bay 112 is a connection portion 124a, which will also be referred to herein as upper connector portion 124a. Similarly, at the rear of the lower bay 110 is a connection portion 124b, which will also be referred to herein as lower connector portion 124b.

In accordance with an embodiment of the present invention, the upper connector portion 124a is electrically connected to lower connector portion 124b by leadframes 126. The leadframes 126 may be made of any suitable material for conducting electrical signals and one end of the leadframes 126 terminates in the upper connector portion 124a in a manner so as to engage and electrically couple with the electrical contacts 62 of the ESA 56 of an optical transceiver module 50 that is plugged into the upper transceiver bay 112. Similarly, the opposite ends of the leadframes 126 terminates in the lower connector portion 124b in a manner so as to engage and electrically couple with the electrical contacts 62 of the ESA 56 of an optical transceiver module 50 that is plugged into the lower transceiver bay 110 (see FIG. 8).

In the exemplary embodiment, the leadframes 126 are substantially parallel wires or metal strips with gaps between the wires or metal strips so as to allow air to flow into cage 100, however other configurations for the leadframes 126 are possible that would also provide for the required electrical connections and air flow into the cage 100 as would be known in the art. Additionally, in other embodiments where it was desired to stack additional transceiver bays vertically, additional connector portions 124a, 124b and leadframes 126 may be used in the manner demonstrated in FIG. 6 to provide the desired electrical connectivity and air flow into the cage 100 for the additional transceiver bays.

Figure 7:
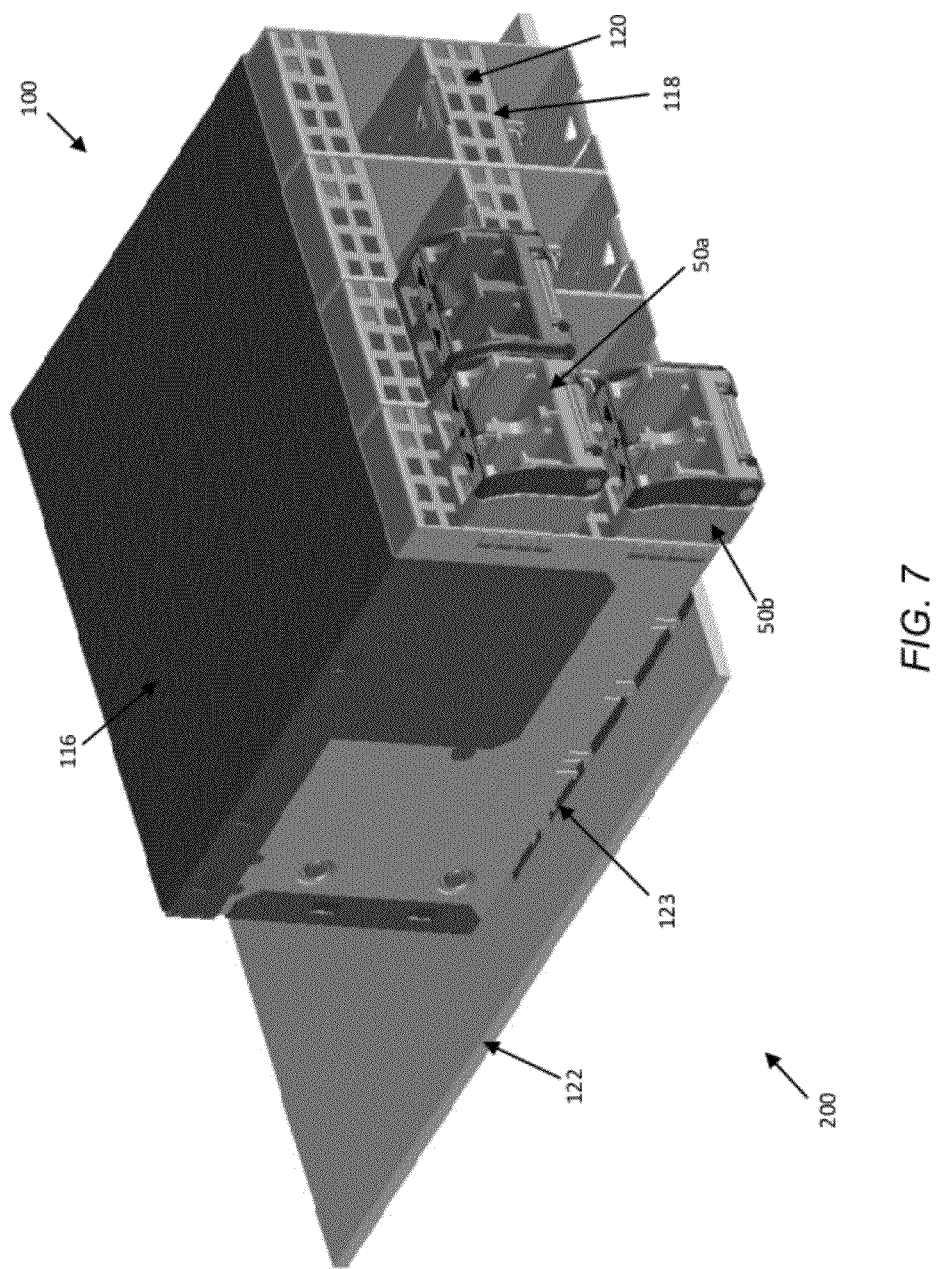
FIG. 7 is a perspective view of the embodiment of the cage shown in FIG. 5 with an embodiment of the optical transceiver module of FIG. 3 engaged in the cage.
Figure 8:
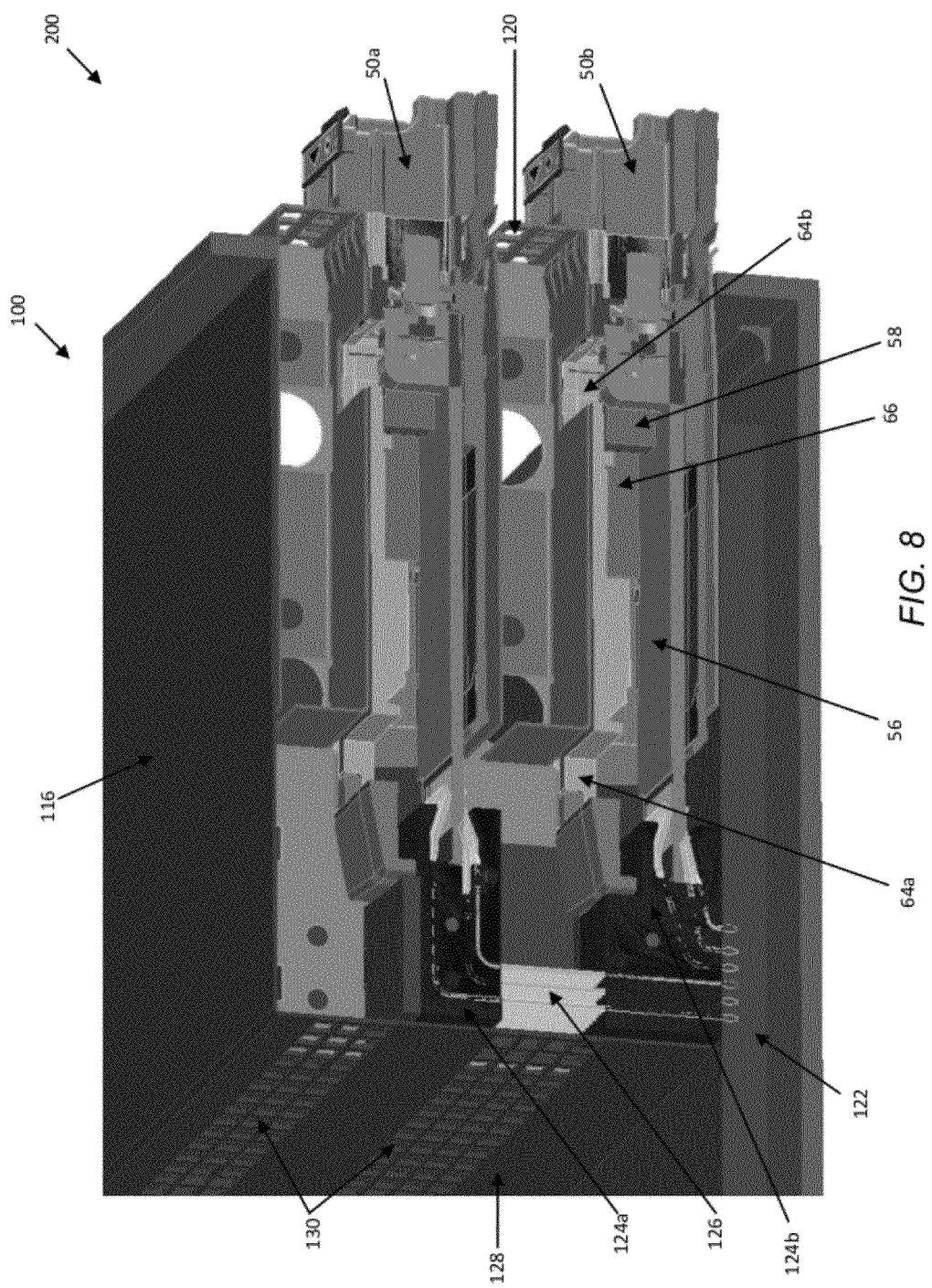
FIG. 8 is a side cut-away view of the embodiment of the cage shown in FIG. 7 with an embodiment of the optical transceiver module of FIG. 3 engaged in the cage, the embodiment of the optical transceiver also shown in side cut-away view.

Turning to FIGS. 7 and 8, an exemplary electronic system 200 is illustrated. As shown in FIG. 7, the electronic system 200 includes a cage 100 attached to a PCB 122. Additionally, upper optical transceiver module 50a is plugged into the upper transceiver bay 112 of the cage 100. Similarly, lower optical transceiver module 50b is illustrated plugged into lower transceiver bay 110 of the cage. FIG. 8 shows a side cut-away view of the exemplary electronic system 200 of FIG. 7. As shown in FIG. 8, the lower optical transceiver module 50b is plugged into the lower transceiver bay 110 of the cage 100 causing the rear end of the lower optical transceiver module 10 to engage the lower connector portion 124b and the terminal ends of the leadframes 126 to electrically couple with the electrical contacts 62 of the ESA 56 of the lower optical transceiver module 50b. The upper optical transceiver module 50a similarly engages the upper connector portion 124a of the upper transceiver bay 112 of the cage 100.

In the exemplary embodiment of FIG. 8, the cage includes a rear cover 128 containing a plurality of rear apertures 130 to allow air flow into the cage 100. The electronic system 200 or its cage 100 can include one or more fans (not shown for purposes of clarity) to force air into the cage for the purpose of direct cooling the optical transceiver modules 50a, 50b. In some embodiments the air blown into the cage may be first cooled to a desired temperature through a variety of known methods, and the mechanism for cooling the air may optionally be part of (or apart from) the fans.

Using the lower transceiver module 50b as an example, air enters the cage 100 through the rear apertures 130, passes though the gaps or spaces between the leadframe wires 126 and enters the body of the lower optical transceiver module 50b through air flow port 64a. The air passes through the length of the lower transceiver module 50b, passing over and dissipating heat from the internal heat sink 66 before exiting the lower transceiver module 50b through air flow port 64b. The air then flows out of the cage 100 through apertures 120 in the front panel 118 of the cage. Due to the close fit of the lower transceiver module 50b in the lower transceiver bay of the cage 100, the air blown in through the rear apertures 130 of the cage will have little escape except through the pathway created by the air flow ports 64a, 64b in the lower transceiver module 50b, ensuring air flow over, and heat dissipation from, the internal heat sink 66.

Air will flow in the same manner through the upper optical transceiver module 50a plugged in the upper transceiver bay 112, as well as through any additional transceiver modules that may be plugged into additional transceiver bays of the cage 100, regardless of whether the additional transceiver bays are stacked vertically on top of the upper transceiver bay 112. By selectively powering an arrangement of fans, and by selectively arranging internal heat sinks 66 in optical transceiver modules 50, cooling can be tailored to the number, type and locations of optical transceiver modules 50 in cage 100. In contrast with conventional systems which may indirectly cool the optical transceiver modules 50 by placing heat sinks on the top cover 116 of the cage 100 and/or blowing cool air around the exterior of the cage 100, embodiments of the present invention allow for more efficient cooling and design as would be recognized by one of skill in the art.

For example, efficiency is improved by the ability to provide separate heat paths for different components of the optical transceiver module 50. For instance, in embodiments using a VCSEL as the light source 58, the VCSEL has a lower maximum allowed operating temperature requirement than other components such as the ESA 56. In conventional systems, the entire optical transceiver module 50 must be cooled to the desired operating temperature of the VCSEL for proper operation. In contrast, by connecting the internal heat sink 66 to the VCSEL light source 58 and direct cooling in accordance with embodiments of the present invention, the desired VCSEL operating temperature can be maintained with less effort, while other internal components of the optical transceiver module 50 can be indirectly cooled and allowed to operate at a higher temperature. Additionally, efficiency is improved in that the present invention can use higher temperature air to achieve a level of cooling that would require much cooler air in conventional systems, requiring less refrigeration of the air used to cool the cage 100.

As can be appreciated from FIG. 8, when optical transceivers are stacked vertically in conventional systems, the transceivers at the bottom of the stack (closest to the PCB 122) are thermally disadvantaged in that they receive less cooling from typical external heat sinks placed on top cover 116 of the cage 100. By directly cooling in accordance with embodiments of the present invention, each optical transceiver module 50 can be equally cooled if desired, regardless of how many optical transceiver units are stacked vertically. This removes a common limitation in the design of cages 100 for electronic systems 200 (transceiver bay stacking), and also substantially reduces the size of conventional heat sinks on the top cover 116 of the cage 100 needed to achieve a desired level of cooling. That is, by using a small internal heat sink 66 in accordance with embodiments of the present invention, a desired level of cooling may be accomplished that for conventional systems would require substantially larger heat sinks placed on the top cover 116 of the cage 100.

It should be noted that this disclosure has been presented with reference to one or more exemplary or illustrative embodiments for the purpose of demonstrating the principles and concepts of the invention. The invention is not limited to these embodiments. Additionally, the word "exemplary" is used herein to mean "serving as an example, instance, or illustration." Any aspect described herein as "exemplary" is not necessarily to be construed as preferred or advantageous over other aspects. As will be understood by persons skilled in the art, in view of the description provided herein, many variations may be made to the embodiments described herein. Therefore, although selected aspects have been illustrated and described in detail, it will be understood that various substitutions and alterations may be made therein without departing from the spirit and scope of the present invention, as defined by the following claims.

What is claimed is:

1. An electrical system, the electrical system comprising:
   a transceiver module with a housing, the housing containing a plurality of apertures to allow air flow into and out of the transceiver module;
   an internal heat sink located within the housing of the transceiver module, the internal heat sink thermally coupled to at least one internal component of the transceiver module; and
   a cage for receiving and electrically connecting to the transceiver module, the cage including a second set of apertures;
   wherein when the transceiver module is inserted into the cage, air may flow into the cage through the second set of apertures, then flow into the transceiver module through one of the plurality of apertures in the housing such that the air dissipates heat from the at least one internal component thermally coupled to the internal heat sink, and then the air may flow out of the transceiver through another of the plurality of apertures in the housing.

2. The electrical system of claim 1 wherein the transceiver module is an optical transceiver module.

3. The electrical system of claim 2 wherein the at least one internal component of the transceiver module is a light source.

4. The electrical system claim 1 wherein the internal heat sink is thermally coupled to more than one internal component of the transceiver module.

5. The electrical system of claim 1 further comprising a second internal heat sink located within the housing of the transceiver module, the second heat sink thermally coupled to a second internal component of the transceiver module.

6. The electrical system of claim 5 wherein the first heat sink and second heat sink are made of different materials.

7. The electrical system of claim 1 wherein the second set of apertures are located in the rear side of the cage, and the cage further includes a third set of apertures located in a front panel on the front side of the cage opposite the rear side.

8. The electrical system of claim 7 wherein after air flows out of the transceiver module through another of the plurality of the apertures, the air flows out of the cage through the third set of apertures.

9. The electrical system of claim 1 wherein the cage further includes a plurality of transceiver bays for receiving and electrically connecting to a plurality of transceiver modules.

10. The electrical system of claim 9 wherein the plurality of transceiver bays includes two or more transceiver bays stacked on top of each other in a vertical direction.

11. An optical transceiver for use in an electrical system, the transceiver comprising:
    a housing assembly with a plurality of apertures located in least one surface of the housing assembly;
    an electronics subassembly (ESA), light source, and light receiver located in the housing assembly; and
    an internal heat sink located in the housing assembly and thermally coupled to at least one of the ESA, light source, and light receiver;
    wherein the internal heat sink is configured to dissipate heat when air flows into the housing assembly through one of the plurality apertures, along a surface of the internal heat sink, and then out of the housing assembly through another of the plurality of apertures.

12. The optical transceiver of claim 11 wherein one of the plurality of apertures is located in a first surface of the housing assembly and a second of the plurality of apertures is located in a second surface of the housing assembly.

13. The optical transceiver of claim 11 wherein the ESA includes electrical contacts to allow the optical transceiver to be hot-plugged into and electrically connected with a cage configured to receive the optical transceiver.

14. The optical transceiver of claim 11 wherein the internal heat sink is thermally coupled to more than one of the ESA, light source, and light receiver.

15. The optical transceiver of claim 11 further comprising a second internal heat sink thermally coupled to at least one of the ESA, light source, and light receiver.

16. A method of cooling, the method comprising:
    providing a transceiver module with a housing, the housing containing a plurality of apertures allowing air flow into and out of the transceiver module;
    providing an internal heat sink located within the housing of the transceiver module, the internal heat sink thermally coupled to at least one internal component of the transceiver module;
    providing a cage for receiving and electrically connecting to the transceiver module, the cage including a second set of apertures; and
    blowing air into the cage through the second set of apertures so that the air flows into the transceiver module through one of the plurality of apertures in the housing, the air dissipates heat from the at least one internal component coupled to the internal heat sink, and the air flows out of the transceiver modules through another of the plurality of apertures in the housing.

17. The method of claim 16 wherein the transceiver is an optical transceiver.

18. The method of claim 16 wherein the internal heat sink is thermally coupled to more than one of the internal components of the transceiver module.

19. The method of claim 16 further comprising providing a plurality of transceiver bays in the cage for receiving and electrically connecting to a plurality of transceiver modules.

20. The method of claim 19 wherein the step of providing a plurality of transceiver bays in the cage for receiving and electrically connecting to a plurality of transceiver modules further comprises stacking two or more transceiver bays in a vertical direction.

* * * * *